Aug. 7, 1956     I. D. SMITH ET AL     2,757,548
SCREW SCRAPER AND WIPER

Filed Oct. 7, 1954     2 Sheets-Sheet 1

INVENTORS
IRA D. SMITH
LEONARD P. SPONTELLI
BY

ATTORNEY

INVENTORS
IRA D. SMITH
BY LEONARD P. SPONTELLI

ATTORNEY

United States Patent Office 2,757,548
Patented Aug. 7, 1956

2,757,548

SCREW SCRAPER AND WIPER

Ira D. Smith, Bedford, and Leonard P. Spontelli, Cleveland, Ohio, assignors to The Cleveland Pneumatic Tool Company, Cleveland, Ohio, a corporation of Ohio Application October 7, 1954, Serial No. 460,956

11 Claims. (Cl. 74—424.8)

This invention relates generally to a screw cleaning device and more particularly to a device for use in conjunction with a ball screw for scraping and wiping foreign matter from the threads of the screw.

In many installations of screw jacks, ball screws and the like, the screw is exposed to the elements with the result that the threads of the screw become clogged with foreign matter of all types. It is particularly important in ball screws that all foreign matter be removed from the screw before it passes into the nut since such matter will prevent proper rolling of the balls and cause malfunction and failure. Those skilled in the art will recognize that a ball screw is a precision device which must be kept clean so that the balls are free to operate in a frictionless manner.

It is an important object of this invention to provide a device for cleaning the threads of a screw and the like.

It is another object of this invention to provide a cleaning mechanism wherein a plurality of fingers engage the surface of a screw providing scraping edges which remove foreign matter therefrom.

It is still another object of this invention to provide a cleaning device for ball screws which cleans the screw before it enters the nut thereby insuring proper frictionless ball operation.

It is still another object of this invention to provide a cleaning device which utilizes a plurality of scraping surfaces formed of relatively rigid material to scrape foreign matter from a screw in combination with a plastic material which rides along the surface of the screw and prevents foreign material loosened by the scraping from passing between the scraping surfaces.

It is still another object of this invention to provide a floating, cleaning device for a screw and nut which is mounted on the nut and is adapted to prevent foreign matter from passing into the nut.

Other objects of this invention not at this time more particularly enumerated will be clearly understood from the following detailed description.

This invention is clearly illustrated in the accompanying drawings in which Figure 1 is a side elevation partially in longitudinal section with some parts removed illustrating one embodiment of this invention used in conjunction with a ball screw device;

Figure 1:
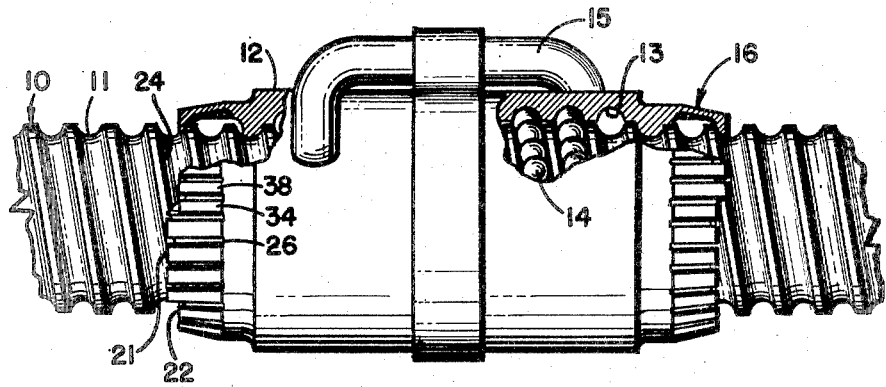
Figure 2:
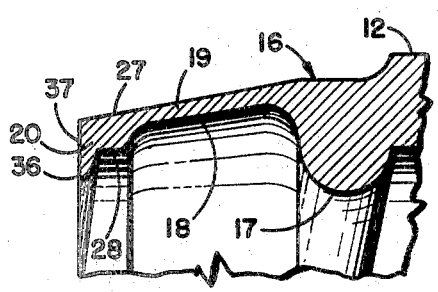
Figure 2 is an enlarged partial longitudinal section showing the finger structure of the cleaning device.

The cleaning device according to this invention is preferably used in conjunction with antifriction ball bearing screw and comprising a body formed with a plurality of axially extending fingers formed with a resilient portion and an inwardly projecting portion axially spaced from the body which extends into engagement with the surface of the screw and provides scraping edges resiliently urged against the screw adapted to scrape foreign matter from the surface of the screw and deflect it away therefrom. Between the scraping edges it is preferable to mould a rubber-like plastic material in such a way that the fingers and the rubber-like material cooperate to form a substantially continuous surface adapted to closely engage the surface of the screw and prevent any foreign matter from remaining on the screw as it threads into the nut.

For a clear understanding of this invention reference should be made to the drawings wherein a ball screw assembly is disclosed which comprises the basic elements of a screw 10 formed with a concave spiral groove 11 and a cooperating nut 12 formed with an internal spiral groove 13. The grooves 11 and 13 cooperate in the usual manner with balls 14 to form a frictionless screw mechanism. A return tube 15 is mounted on the nut 12 and provides a closed return passage to guide the balls 14 between the ends of the groove 13. The specific structural details of the ball screw elements are of conventional design and form no part of this invention except in conjunction with the cleaning device.

The cleaning device is shown generally at 16 and, in the embodiment of Figures 1 through 9, is formed integrally with the nut 12. Identical cleaning devices are formed at each end of the nut 12 so that as the screw 10 is threaded through the nut axially in either direction, foreign matter will be removed from the surface of the screw prior to the entrance of any given portion of the screw into the nut per se.

The metallic portion of the cleaning device is formed by first machining internal helical threaded like convolutions 17 through the entire length of the cleaning device 16 which convolutions are adapted to closely fit the surface of the screw. An internal recess 18 is then cut to a diameter greater than the largest diameter of the screw to provide a thin resilient section 19 and an inwardly projecting portion 20. The outer end of the cleaner is then machined off leaving a portion 21 projecting axially beyond a second portion 22 with one side 23 of the projecting portion 20 arranged to extend across the outward section 24 of the groove 11. A plurality of equally spaced longitudinal extending radial slots 26 are thereafter cut in the outer end of the cleaning device toward the nut thereby forming completed fingers 27. The slots 26 should be formed so that the fingers 27 form a substantially continuous annulus around the screw 10. It is apparent that the inner surfaces 28 of the projecting portions 20 are properly formed to fit against the particular surface of the screw engaged thereby because they are portions of the convolutions 17 originally cut in the cleaning device.

The inwardly projecting portion 20 of each finger is resiliently urged into engagement with the screw 10 and various methods may be utilized to accomplish this engagement. The fingers 27 may be permanently deformed inwardly with the screw removed so that the fingers are deflected radially outward by the portion 20 and the screw 10 or the inner surface 28 of the projecting portion 20 may be machined slightly undersize so that the fingers are deflected radially outward by the engagement between the projecting portion 20 and the screw 10. Either arrangement insures proper resilient engagement between the inner surface 28 and the screw 10.

Figure 3:
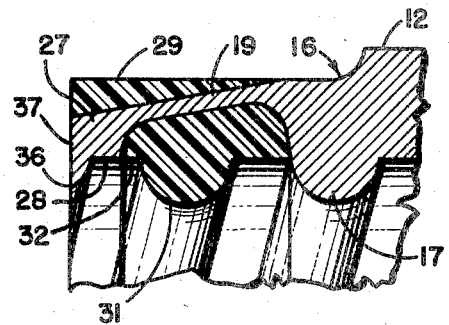
Figure 3 is a partial longitudinal section similar to Figure 2 showing the plastic portion of the cleaning device as initially moulded on the fingers.
Figure 4:
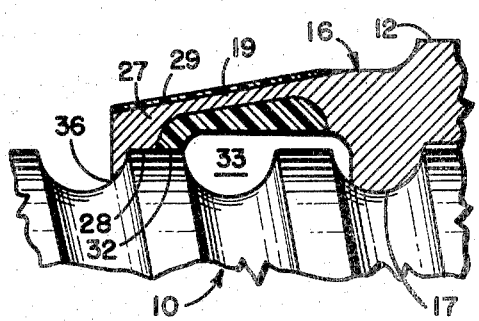
Figure 4 is a partial longitudinal section of the preferred finger structure.
Figure 5:
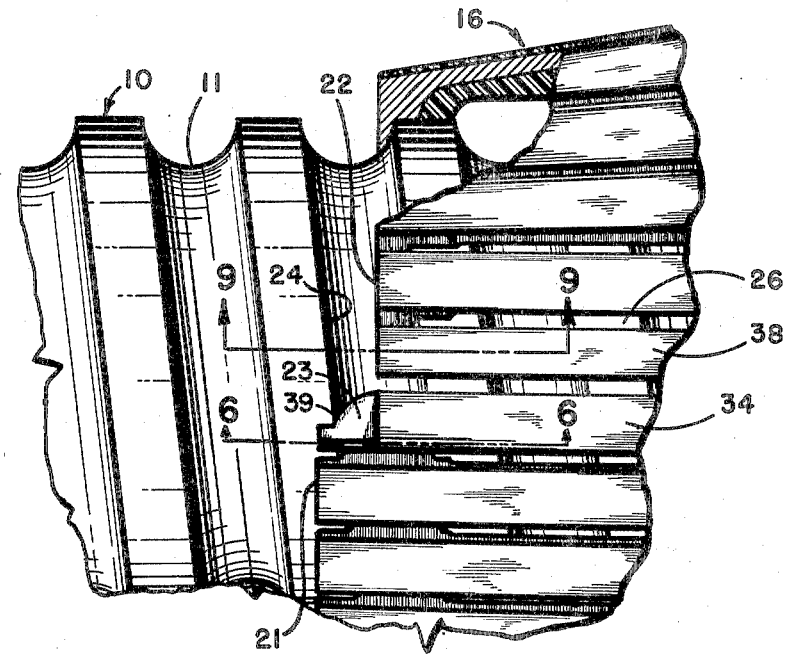
Figure 5 is an enlarged fragmentary side elevation with some parts removed illustrating the shape of the ends of the fingers.
Figure 6:
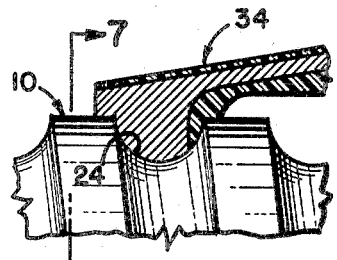
Figure 6 is a fragmentary longitudinal section taken along 6—6 of Figure 5.
Figure 7:
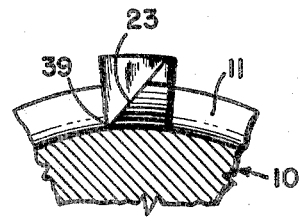
Figure 7 is a fragmentary section taken along 7—7 of Figure 6.
Figure 9:
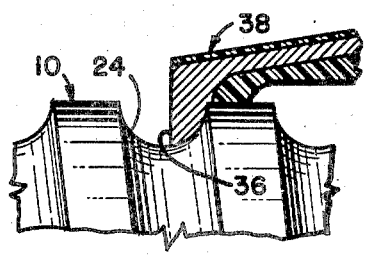
Figure 9 is a fragmentary longitudinal section taken along 9—9 of Figure 5.
Figure 8:
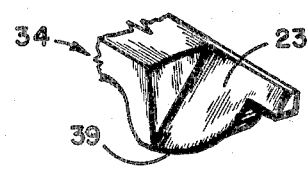
Figure 8 is a fragmentary perspective view of the end of the finger shown in Figures 6 and 7.

A rubber-like plastic material 29 is mounted on and bonded to the fingers 27 as shown in Figure 3 so that it projects through the slots 26 to provide a firm anchorage as well as to close the slots and prevent foreign material from entering therethrough. In Figures 1 and 5 the rubber-like material in the slots 26 is not shown so that the finger structure per se is more readily seen. However, it should be understood that the outer portion of the cleaner will be enclosed by the rubber-like material so that foreign material cannot penetrate the slots. The preferred method of forming the rubber-like material is to mold it on to the cleaner while the cleaner is positioned around a screw. The rubber-like material 29 is thereby formed with internal convolutions 31 along its inner surface adapted to closely fit the surface of the groove 11. The outer end surface of the plastic material is axially aligned with the outer ends 37 of the fingers 27 and forms in cooperation with the fingers a continuous surface around the screw. The inner surface 32 of the rubber-like material 29 engages the surface of the screw and provides a wiping action which tends to help clean the screw. However, if frictional drag caused by this engagement is critical some of the rubber-like material 29 is cut out to form a recess 33 between the screw and rubber-like material. It is also desirable to trim the excess of the rubber-like material 29 beyond the fingers 27 so that a completed finger similar to the one shown in Figure 4 is provided. On all of the fingers the outer edge 36 in engagement with the screw forms a scraping edge perpendicular to the axis of the screw which scrapes any foreign matter away from the screw as it is threaded through the cleaner into the nut and the rubber-like material 29 prevents any of the loosened foreign matter from passing into the nut through the slots 26. Since the scraping edge 36 is formed by the intersection of the end surface 37 and the internal surface 28 of the end portion 20, difficulty would be encountered in cleaning the portion 24 of the groove 11 unless other means were provided. This is due to the fact that the inner surface 28 adjacent to the end surface 37, on fingers terminating in the portion 24, approaches the radial direction and therefore does not provide a sharp scraping edge. The foreign matter on the screw in this zone would therefore tend to force its way under the finger causing failure of the device. To overcome this difficulty the finger 34 is arranged to project beyond the adjacent finger 33 so as to provide a scraping edge 39 extending axially relative to the screw 10.

The side 23 of the finger 34 should be formed so that the scraping edge 39 defined by the intersection of the side 23 and the inner surface 28 is relatively sharp. By utilizing this structure, section 24 of the groove 11 is engaged by a relatively sharp scraping edge so proper cleaning will be insured.

Figure 10:
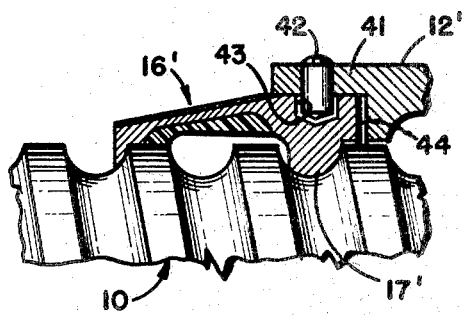
Figure 10 is a partial longitudinal view of a modified form of wiper which is a separate element mounted on the nut of the ball screw.

The embodiment of this invention shown in Figure 10 is structurally similar to that shown in Figures 1 to 9; however, the cleaning device 16' is formed as a separate element mounted on each end of the nut. In this form it is preferable to provide a mounting for the cleaning device 16' which will permit a limited amount of relative motion between the nut and the cleaning device to insure proper alignment. To accomplish this mounting it is preferable to form the nut 12' with an axially extending annular flange 41 which is adapted to surround and receive the inner end of the cleaner 16'. Pins 42 extend through this annular flange with a press fit into apertures 43 in the cleaner 16'. The apertures 43 are formed slightly oversize to provide a limited amount of relative motion between the pins 42 and the cleaner 16'. Only a single pin is shown in Figure 10. However, a plurality of similar pins should be placed around the periphery of the cleaning device to insure proper mounting. Again in the preferred form the end wall 44 of the cleaning device 16' is slightly spaced from the nut so that relative motion between the elements may be accomplished without binding or locking of the screw. The convolutions 17' provide bearing surface to properly align the cleaning device with the screw.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A cleaning device for a screw comprising a body mounted on said screw for movement relative thereto formed with a plurality of axially extending fingers with the free ends thereof curved inwardly to provide scraping edges engageable with the screw for cleaning the surface thereof upon relative rotation between said body and screw, said fingers being formed with a resilient section intermediate said body and free ends adapted to be deflected radially outward by engagement between said free ends and the screw whereby said scraping edges will be resiliently urged into engagement with the surface of the screw.

2. A cleaning device for a screw comprising a body formed with a plurality of circumferentially spaced fingers providing scraping edges engageable with the screw for cleaning the surface upon relative movement between scraping edges and screw, resilient means for urging said scraping edges into tight engagement with the screw, and resilient plastic material secured to said fingers engageable with the screw between said edges for wiping the screw and preventing foreign material loosened by said edges from passing therebetween.

3. A cleaning device for a screw formed with spiral grooves comprising a plurality of screw engaging projections adapted to form an annulus around a screw engageable therewith, at least two of said projections being formed with a scraping edge substantially aligned with the scraping edges on the other projections for removing foreign matter from said screw upon relative motion therebetween, and resilient plastic material bonded to said projections engageable with the screw forming in cooperation with said projections a continuous cleaning surface adapted to surround a portion of the screw, said plastic material preventing foreign material scraped from said screw by said edges from passing therebetween.

4. A cleaning device including an annular body formed with a plurality of fingers providing scraping edges for engaging a screw formed with a helical groove and cleaning the surface thereof upon relative movement therebetween, and resilient means for pressing each of said edges against the screw, at least one of said fingers projecting axially beyond an adjacent finger and providing an axially extending scraping edge beyond the scraping edge of said adjacent finger.

5. A cleaning device including an annular body formed with a plurality of fingers providing scraping edges for engaging a screw formed with a helical groove and cleaning the surface thereof upon relative movement therebetween, and resilient means for pressing each of said edges against the screw, at least one of said edges being contained in a plane perpendicular to the axis of aid body, at least one of the other of said edges extending axially relative to said body beyond said one edge, said other of said edges being adapted to engage the side of the groove remote from the cleaning device.

6. In combination a screw formed with a helical groove and a cooperating cleaning device, said cleaning device including a body formed with a plurality of spaced fingers providing scraping edges engaging said screw and cleaning the surface thereof upon relative movement therebetween, and resilient means pressing each of said edges against said screw, at least one of said edges extending axially relative to said screw engaging the side of said groove remote from said cleaning device and a rubber-like material bonded to said fingers closing the space therebetween.

7. In combination a screw formed with a helical groove and a cooperating cleaning device, said cleaning device including a body formed with a plurality of fingers providing scraping edges engaging said screw and cleaning the surface thereof upon relative movement therebetween, and resilient means pressing each of said edges against said screw, at least one of said edges being contained in a plane perpendicular to the axis of said body, at least one of the other of said edges extending axially relative to said body beyond said one edge, said other edges being adapted to engage the side of the groove remote from said cleaning device.

8. In combination a screw formed with a helical groove, a nut formed with complemental helical grooves, balls engaging and rolling along said groove upon relative movement between said nut and screw, and a thread cleaner on each end of said nut; said thread cleaner including a body formed with a plurality of circumferentially spaced fingers providing a serrated annulus around said screw in engagement with the surface thereof for scraping foreign matter therefrom upon relative movement therebetween, rubber-like material mounted on said fingers engaging said screw closing the openings between said fingers preventing foreign matter loosened by said fingers from passing therebetween into said nut, and resilient means resiliently urging said fingers against said screw.

9. In combination a screw, a nut on said screw, and a thread cleaner on each end of said nut; said thread cleaner including a body formed with a plurality of circumferentially spaced fingers providing a serrated annulus around said screw in engagement with the surface thereof for scraping foreign matter therefrom upon relative movement therebetween, guide means on said body engaging said thread and positioning said thread cleaner relative to said screw, rubber-like material mounted on said fingers engaging said screw closing the openings between said fingers preventing foreign matter loosened by said fingers from passing therebetween into said nut, and mounting means mounting said thread cleaners on said nut for limited movement relative thereto.

10. In combination a screw formed with a helical groove, a body mounted on said screw for movement relative thereto formed with a plurality of axially extending fingers with the free ends thereof curved inwardly to provide scraping edges engaging said screw for cleaning the surface thereof upon relative rotation between said screw and body, said fingers being formed with a resilient section intermediate said body and free ends, the free ends of said fingers being deflected radially outward by engagement with said screw whereby said scraping edges are resiliently urged into engagement wtih the surface of said screw.

11. In combination a helically grooved nut and a helically grooved screw cooperating to provide axial motion upon relative rotation therebetween, a body mounted on said nut for limited motion relative thereto formed with a plurality of axially extending fingers with the free ends thereof curved inwardly to provide scraping edges engaging said screw for cleaning the surface thereof upon relative rotation between said nut and screw, said fingers being formed with a resilient section deflected away from its unstressed condition by engagement between said free ends and screw whereby said scraping edges are resiliently urged into engagement with the surface of said screw.

References Cited in the file of this patent

UNITED STATES PATENTS 2,567,483      Hotine _____ Sept. 11, 1951